United States Patent [19]

Porter et al.

[11] Patent Number: 4,841,798
[45] Date of Patent: Jun. 27, 1989

[54] FOOT-OPERATED SELF-ADJUSTING PARKING BRAKE APPARATUS WITH CONTROLLED FLYBACK

[75] Inventors: Curtis H. Porter; Jeffrey E. Tayon; Larry B. Champ, all of Moberly, Mo.

[73] Assignee: Orscheln Co., Mo.

[21] Appl. No.: 238,131

[22] Filed: Aug. 30, 1988

[51] Int. Cl.[4] .......................... F16C 1/10; G05G 5/06
[52] U.S. Cl. .................................. 74/501.5 R; 74/512; 74/535; 74/542
[58] Field of Search .............. 74/512, 575, 577 M, 74/577 R, 578, 531, 533, 535, 540, 541, 542, 501.5 R; 188/2 C

[56] References Cited

U.S. PATENT DOCUMENTS

| | | | |
|---|---|---|---|
| 3,184,992 | 5/1965 | Hinsey | 74/539 X |
| 3,211,269 | 10/1965 | Emig | 74/577 X |
| 3,487,716 | 1/1970 | Hirst . | |
| 3,693,472 | 9/1972 | Hirst . | |
| 3,768,612 | 10/1973 | Gale . | |
| 3,789,967 | 2/1974 | Dau et al. . | |
| 3,875,820 | 4/1975 | Morden | 74/512 |
| 3,974,713 | 8/1976 | Toohey | 74/512 |
| 4,127,042 | 11/1978 | Lipshield . | |
| 4,257,282 | 3/1981 | Wilczewski | 74/578 X |
| 4,271,718 | 6/1981 | Bopp et al. . | |
| 4,320,389 | 3/1982 | Caruso | 74/575 X |
| 4,378,713 | 4/1983 | Haskell et al. . | |
| 4,612,823 | 9/1986 | De Leeuw | 74/559 X |

Primary Examiner—Gary L. Smith
Assistant Examiner—Flemming Saether
Attorney, Agent, or Firm—Laubscher, Prosta & Laubscher

[57] ABSTRACT

An improved parking brake cable control apparatus includes an automatic cable tensioning device that is operable at the beginning and end of every parking brake operating cycle to take up cable slack and maintain uniform cable tension. The foot-operated parking brake lever pivots on a main pivot shaft between brake-engaged and brake-released positions, a releasable pedal pawl being provided that cooperates with a conventional pedal ratchet. A cable-tensioning ratchet connected with the parking brake cable is rotatably mounted on the main pivot shaft, and cooperating therewith are a lock pawl and a drive pawl connected with the apparatus housing and with the lever, respectively. The lock pawl is released by a release lever when the pedal is pivoted toward the released position, and the drive pawl is disengaged when the lever is adjacent the disengaged position, thereby to activate the cable tensioning device.

10 Claims, 9 Drawing Sheets

FOOT-OPERATED SELF-ADJUSTING PARKING BRAKE APPARATUS WITH CONTROLLED FLYBACK

REFERENCE TO RELATED APPLICATIONS

This application is related to the copending applications of Curtis H. Porter Ser. No. 225,287 filed July 28, 1988 entitled "Push-to-Release Cable Operating Apparatus", Vernon E. Stewart Ser. No. 164,422 filed Mar. 4, 1988 entitled "Reaction Cable Assembly Including Cable Slack Adjusting Means", and Tave Hass et al Ser. No. 221,204 filed July 19, 1988 entitled "Soft Release Cable Operating Means", each assigned to the same assignee as the present invention.

BRIEF DESCRIPTION OF THE PRIOR ART

It is known in the patented prior art to provide brake cable operating controls including a foot-operated parking brake lever that is operable between brake-released and brake-engaged positions, and that is maintained in place by releasable pawl and ratchet means. Examples of such parking brake systems are shown, among others, by Hirst U.S. Pat. No. 3,487,716, 3,693,472 and Lipshield U.S. Pat. No. 4,127,042, also assigned to the same assignee as the present invention.

It is also well known in the prior art to provide cable slack adjusting means in cable systems for automotive vehicles. Evidence of such devices is presented by the patents to Gale U.S. Pat. No. 3,768,612, Dau et al U.S. Pat. No. 3,789,967, Bopp et al U.S. Pat. No. 4,271,718, and Haskell et al U.S. Pat. No. 4,378,713, among others.

SUMMARY OF THE INVENTION

The present invention relates to a pedal-or lever-operated parking brake or similar control mechanism, including a lever arm which is pivotally connected with a suitable mounting means and which provides indirect drive by means of conventional ratchet and pawl to a cable take-up mechanism with direct locking thereof, the system having a two-stage release. This mechanism is equipped with an automatic tension compensating device for maintaining a desired minimum cable tension.

A primary object of this invention is to provide a parking brake control mechanism which automatically compensates for lack of cable tension and/or slack due to wear. The self-adjuster insures a constant tension prior to and after each cycle. When the control is in the "OFF" position, the self-adjuster maintains a state of equilibrium with respect to the cable tension and/or slack.

According to a more specific object of the invention, the inner parking brake cable member is connected with a tensioning ratchet that is rotatably mounted on the same pivot shaft that supports the parking brake applying lever. Spring means bias the ratchet the cable-tensioning direction relative to the lever, and lock and drive pawls connect the ratchet with the stationary housing and with the lever, respectively. A conventional pedal pawl connects a ratchet associated with the lever to the housing, said pedal pawl being released either manually by manually-operable release means, or automatically by a vacuum-responsive motor. Release lever means are provided for disengaging the lock pawl as the lever returns to its brake-disengaged position, and stationary tab means are provided on the housing for disengaging the drive pawl when the lever is immediately adjacent the fully brake-disengaged position, thereby to permit automatic taking up of cable slack by the tension adjuster spring.

Another object of this invention is to provide a control mechanism which eliminates high energy impact on the return stroke, hereinafter referred to as "slam off". This is accomplished through the use of a spiral spring which acts as a dampening device to absorb slam off as it occurs during the release process.

In a traditional parking brake control mechanism, the relatively massive assembly of the pedal, the ratchet, clevis and/or other connecting means, traditionally return simultaneously. In the present control, the mass of the pedal has been separated on the return stroke with respect to the cable track and ratchet. The cable track and ratchet have the greatest amount of inertia upon the return due to the high energy in the cable upon instantaneous release and have no direct impact to the mounting bracket upon that release, therefore no "slam off" effect.

Another object of this invention is to provide a mechanism which allows for the option of a vacuum release. The vacuum canister is simply an "add on" part which requires no additional tooling or special fabrication.

A further object of this invention is to provide a mechanism which makes use of a conventional ratchet/pawl locking device. This device, in operation, uses the same ratchet for the self-adjuster and locking mechanisms resulting in fewer parts used. The ultimate result is a more cost-effective mechanism.

Another object of the present invention is to provide a mechanism which operates in the apply mode as a normal parking brake control and upon release, the pedal initiates the release of the cable load by its return to an OFF position.

Still another object of this invention is to provide a mechanism with a limit device to the adjuster so that it may not be wound past its designed torque and a minimal limit, thereby to simplify cable service.

BRIEF DESCRIPTION OF THE DRAWINGS

Other objects and advantages of the invention will become apparent from a study of the following specification when viewed in the light or the accompanying drawings, in which.

DETAILED DESCRIPTION

Figure 1:
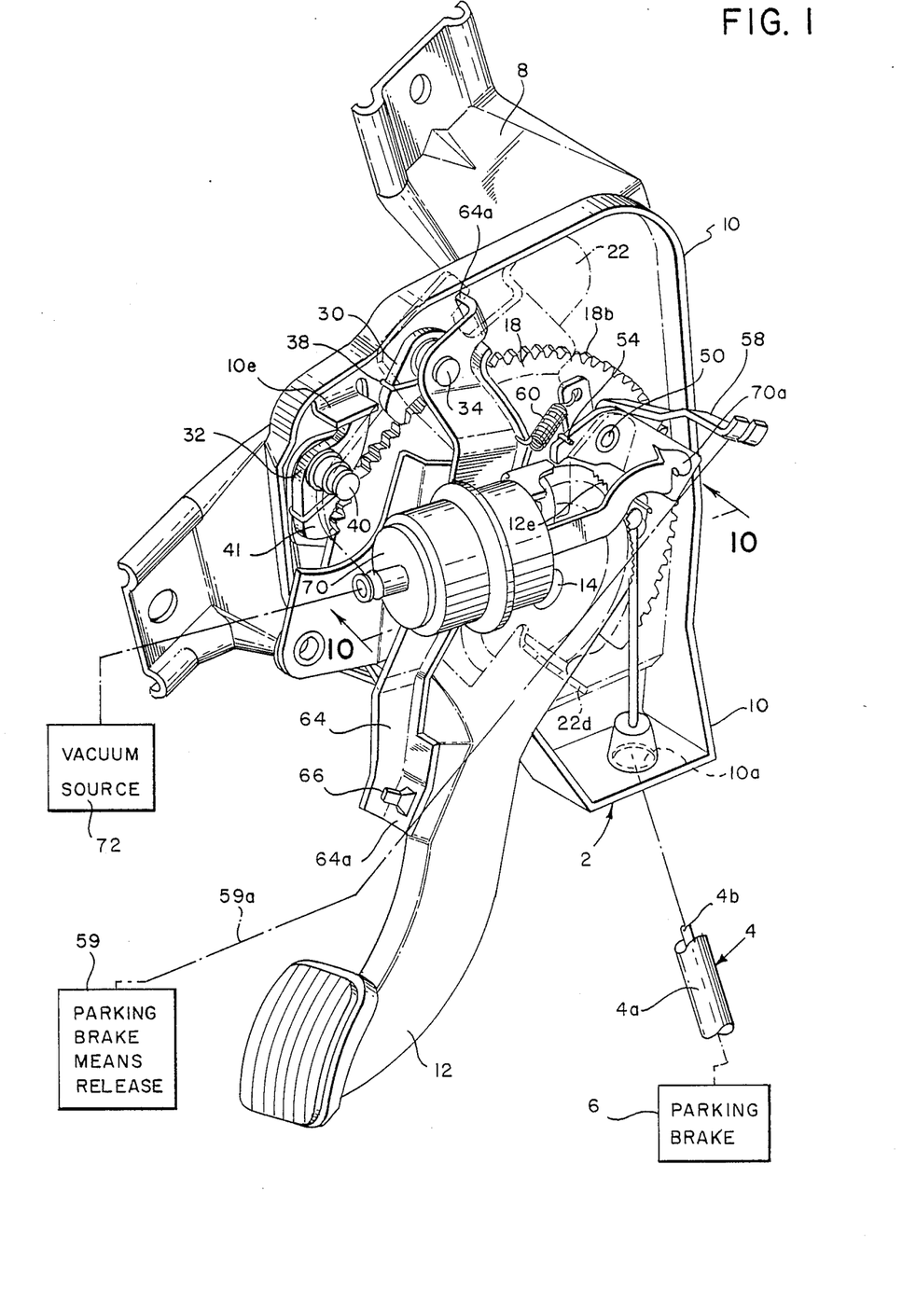
FIGS. 1 and 1A are perspective and exploded views, respectively, or the improved brake control apparatus of the present invention.
Figure 1A:
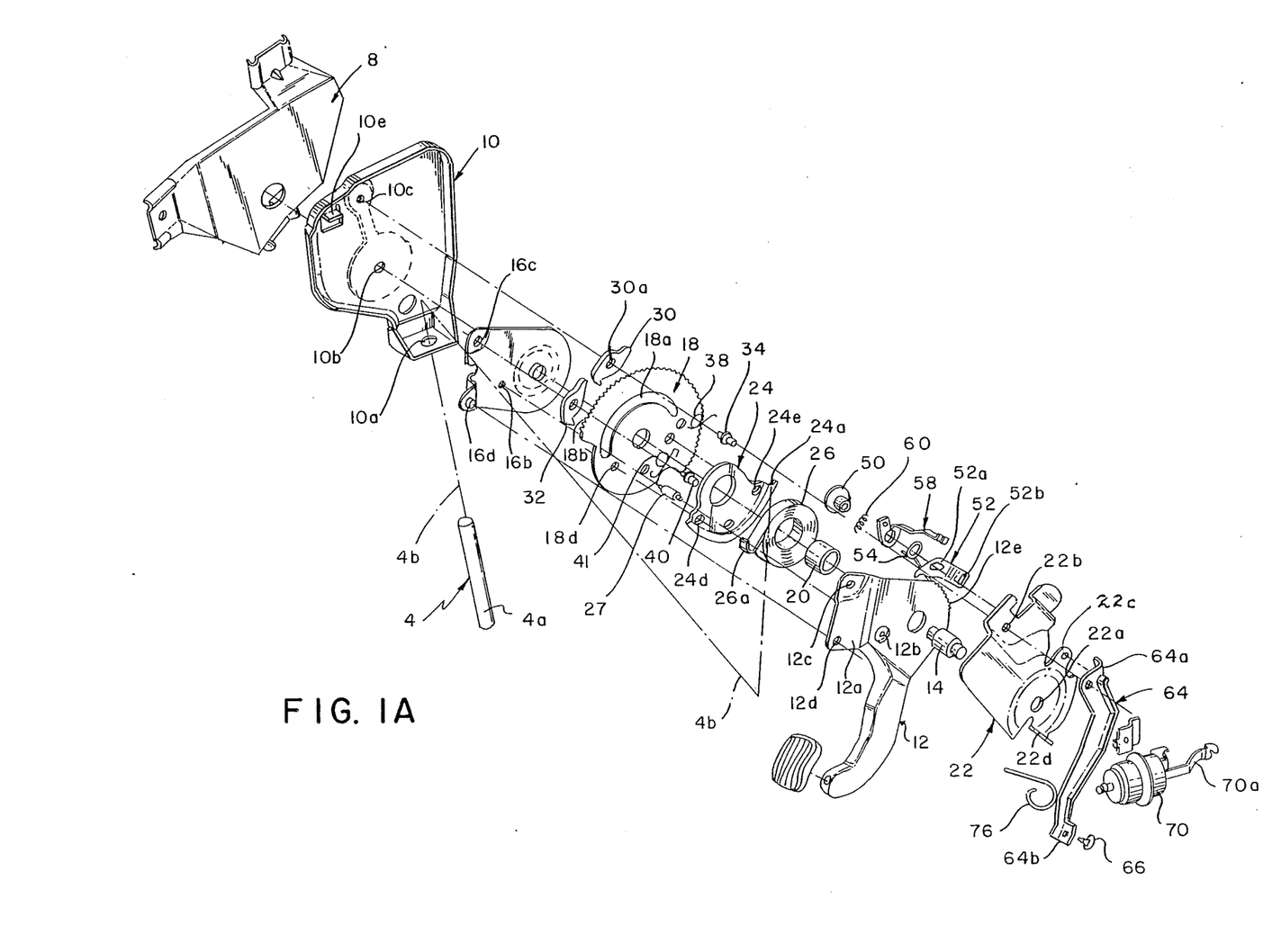
Figure 10:
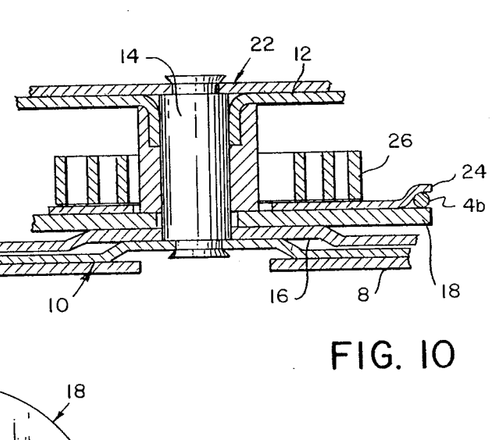
FIG. 10 is a detailed sectional view taken along line 10—10 of FIG. 1.

Referring first and more particularly to FIGS. 1, 1A and 10, the foot-operated parking brake apparatus 2 for operating the coaxial brake control cable 4 associated with the parking brake 6 of a motor vehicle includes a riser bracket 8 to which is secured (by clinching, welding, or the like) a mounting bracket 10. This unit is fastened to the fire wall of the vehicle by suitable fastening means, such as bolts (not shown). The outer cable member 4a is fastened at one end in an opening 10a contained in the mounting bracket 10, and the inner cable strand 10b is connected for operation by the foot-operated parking brake lever 12, as will be described below.

A main pivot shaft 14 is secured at one end in an opening 10b contained in mounting bracket 10, and successively mounted in concentric relation on this shaft are drive plate 16, ratchet 18, longitudinally-split pivot sleeve 20, and the plate-like upper portion 12a of lever 12. The other end of pivot shaft 14 is supported in an opening 22a of cover member 22 that is secured (by clinching, welding or the like) to mounting bracket 2. Mounted concentrically about the pivot sleeve 20 are a cable track member 24 and a spiral adjuster spring 26, the cable track member having a curved flange portion 24a that extends concentrically beneath the adjuster spring and that is connected at its upper edge with the inner strand member 4b of the parking brake cable. Ratchet 18 contains an arcuate slot 18a that receives a drive stud 27 the ends of which are supported in openings 12b and 16b contained in lever 12 and drive plate 16, respectively. Associated with the teeth 18b of ratchet 18 are a lock pawl 30 and a drive pawl 32. Lock pawl 30 is pivotally mounted on a pivot pin 34 that is supported at one end in opening 10c contained in mounting bracket 10, the other end of this pivot pin extending through a corresponding opening 22b contained in cover member 22. Coil spring 38 mounted on pivot pin 34 normally biases pawl 30 toward engagement with the ratchet teeth 18b. Similarly, drive pawl 32 is pivotally mounted on pivot pin 40 the ends of which are supported in corresponding openings 12c and 16c contained in lever 12 and drive plate 16, said drive pawl being normally biased by coil spring 41 toward engagement with ratchet 18. Lever 12, drive stud 27 and drive plate 16 are further connected together as a first assembly by a bolt (not shown) that extends through lever opening 12d and drive plate opening 16d, and cable track member 24 is bolted to ratchet 18 by bolts (not shown) that extend through corresponding openings 18d and 24d, and 18e, and 24C, respectively, thereby to define a second assembly. The outer end 26a of the adjuster spring is bent outwardly for reaction with drive stud 27, and the inner end of the adjuster spring is bent inwardly for insertion within longitudinal slot 20a of pivot sleeve 20. The left hand end of pivot sleeve 20 is secured (by welding or clinching, for example) with the ratchet 18. Thus, one end of the adjuster spring reacts with the first assembly including drive stud 27, drive plate 16 and foot-operated lever plate 16 and foot-operated lever 12, and the other end of the adjuster spring reacts with the second assembly including pivot sleeve 20, ratchet 18 and cable track 24.

Pivotally mounted on a pivot pin 50 mounted in opening 22c contained in cover 22 is a pedal pawl 52 that is biased by coil spring 54 into engagement with ratchet teeth 12e provided on the plate-like upper portion 12a of lever 12. Also pivotally mounted on pivot pin 50 is a manual release lever 58 that is biased in the counterclockwise direction in FIG. 1A by a coil spring 60. This lever 58 is operable by the parking brake manual release means 59 via cable 59a (FIG. 1.), hereby to pivot pedal pawl 52 to the released position relative to pedal ratchet teeth 12e. Pivotally mounted at one end on the end of pivot pin 34 that extends through the pivot opening 30a of lock pawl 30 is a lock pawl release lever 64 having a first lateral tab portion 64a arranged to engage the lock pawl 30 for pivoting the same in the pawl-released direction relative to ratchet 18 against the biasing force of the return spring 38. At its other end, the lock pawl lever has a second lateral tab portion 64b provided with a synthetic plastic button 66 arranged for engagement by the adjacent surface of foot pedal 12, so that when the foot pedal is in its brake-released position, release lever 64 pivots pawl 30 to the unlocked condition relative to ratchet 18. Spring 60 is connected between lock pawl release lever 64 and manual release lever 58.

A vacuum-responsive diaphragm motor 70 is secured to the cover 22 and includes an output shaft 70a arranged for cooperation with slot 52b to disengage pedal pawl 52 from pedal ratchet teeth 12e upon the occurrence of vacuum from source 72 (for example, upon firing of the internal combustion engine of the vehicle). A shipping pin 76 is inserted through the cover 22, adjuster/track sub-assembly 24, 26, and into the mounting bracket 10, thereby to maintain the adjuster mechanism in a pre-load state until the cable is installed, whereupon pin 76 is pulled and the self-adjuster operates to take up cable slack.

Operation

Figure 2:
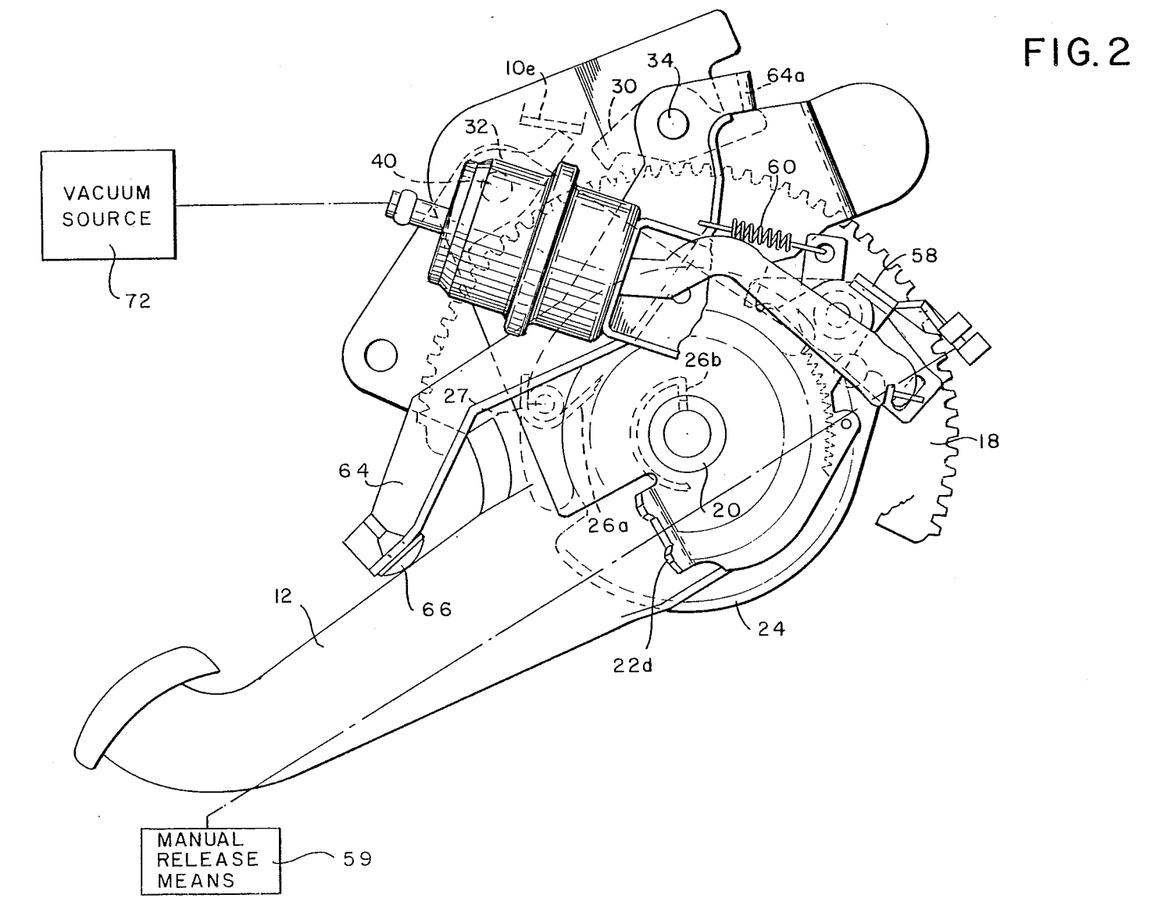
FIG. 2 is a detailed somewhat schematic side elevational view, with certain parts removed, of the apparatus when in the brake-released at-rest condition.

Referring now to FIG. 2, the mechanism is illustrated in the fully-released the condition where the adjuster/track sub-assembly 26,24 is allowed to freely rotate in a direction so as to cause greater cable tension until a point of equilibrium is reached, thereby insuring a minimum tension and lack of cable slack at each stroke. The lock pawl 30 is held out by the lock pawl release lever 64 which is rotated to the "release position" by the pedal 12 owing to the engagement between lever 12 and button 66. The drive pawl 32 is held out of engagement with ratchet teeth 18b by a fixed tab 10e on the mounting bracket 10, thereby allowing free rotation of the self-adjuster in either the clockwise or the counterclockwise direction. The ends 26a and 26b of the preloaded spring 26 react between the drive stud 27 and with the ratchet pivot sleeve 20, thereby to rotate the ratchet 18 and the cable tract 24 in the cable-tensioning direction relative to lever 12. Thus, the advantage is presented of "over adjust" safeguard, owing to the lock pawl 20 and drive pawl 32 being maintained in the disengaged condition.

Figure 3:
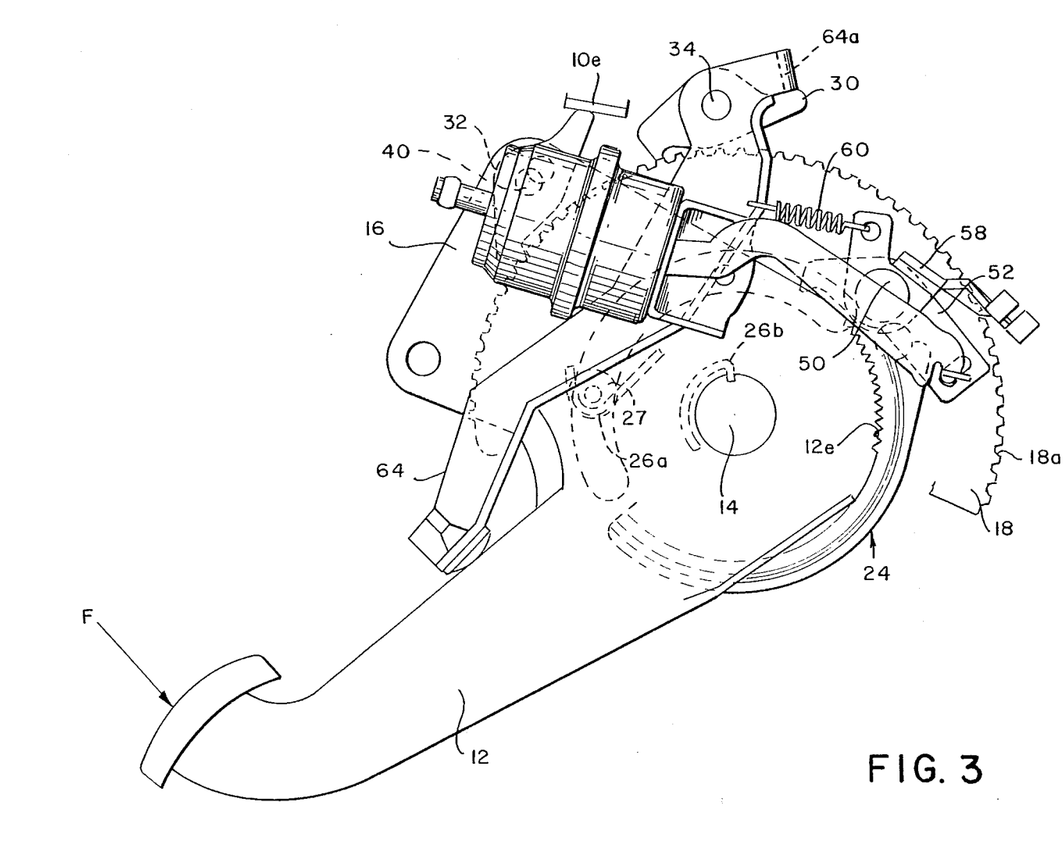
FIGS. 3-6 are detailed schematic side elevational views illustrating the operation of the brake control apparatus in the brake-applying, locked, first phase of a release cycle, and final phase of a release cycle, respectively.

Referring now to FIG. 3, when the operator applies a brake-engaging force F to the pedal 12, rotation direction about the main pivot axis 14 is initiate. Owing to the drive pawl 32 being fixed between the pedal 12 and the drive plate 16, it begins to rotate away from the fixed tab 10e, thereby allowing the drive pawl 32 to engage in the ratchet teeth 18a to initiate cable take up. At this point, the ratchet 18 is connected with the pedal 12, and both legs of the adjuster spring 26a and 26b are locked so as to retain spring position during the "apply" and "lock" cycle. After a specified amount of stroke otherwise known as "free travel", the lock pawl release lever 64 is rotated to an off position by the release lever spring 60 which in turn allows the lock pawl 30 to engage in the ratchet 18, thereby allowing the cable load to be held by the connection between ratchet 18 and the mounting bracket means 10.

Figure 4:
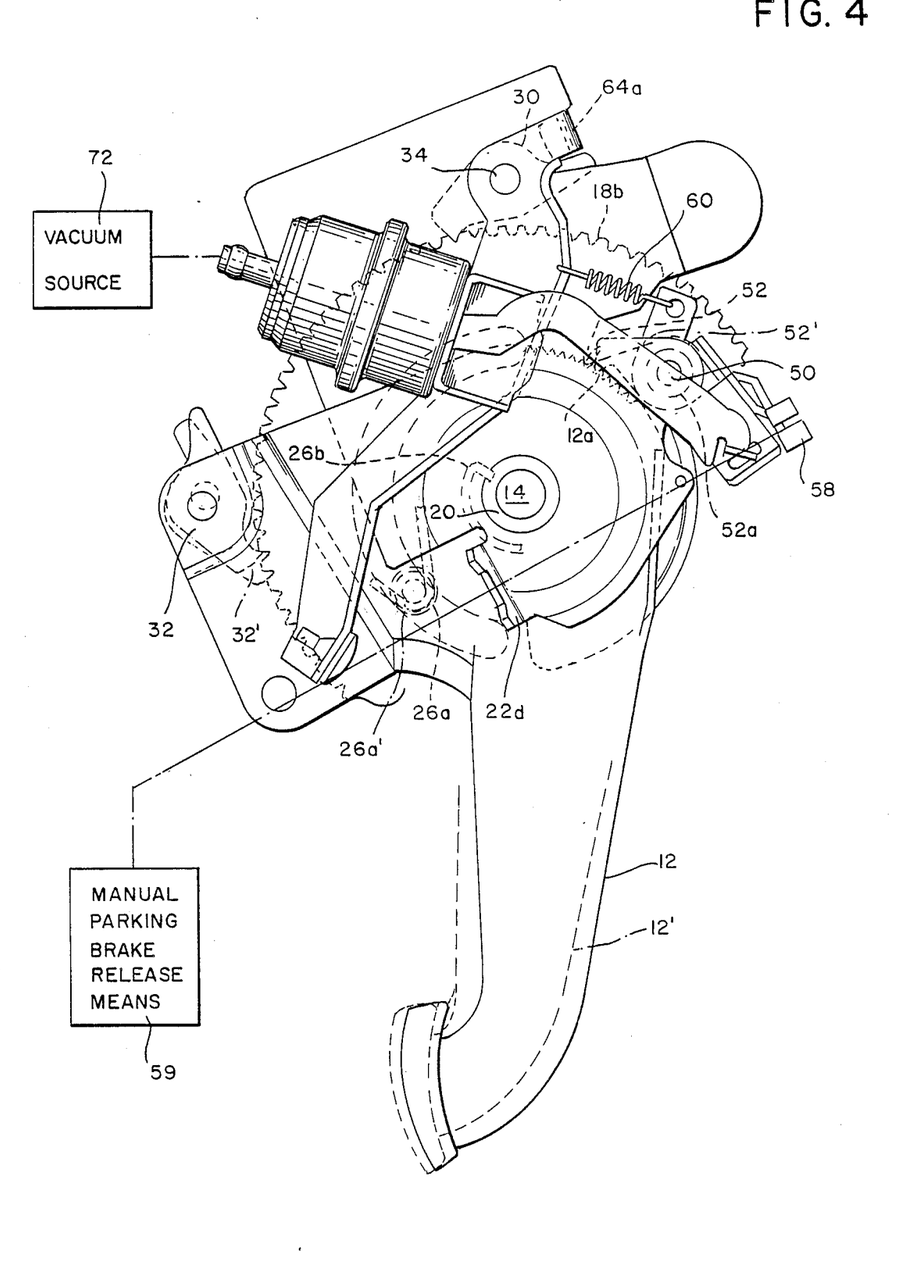

Referring now to FIG. 4, as the operator continues the brake-applying force from the position in FIG. 3, at a point designed to be the end of the "free travel", the pedal pawl 52 engages pedal ratchet notches 12e integral with the lever 12. At any time after the pedal pawl (52) begins to ratchet, the operator's foot may be removed and the mechanism will maintain the resultant cable load. At the time that the operator's foot is removed, the pedal pawl 52 is driven to the end of an internal slot 52a (FIG. 1A) to position 52'. At the same time the pedal 12 "back drives" to position 12' The drive pawl 32 is relieved to position 32' shown in phantom, and at this time the adjuster spring end 26a is allowed to relax to position 26a' insuring that the lock pawl 30 is fully engaged in a notch of the ratchet 18, thereby holding the cable load.

Figure 5:
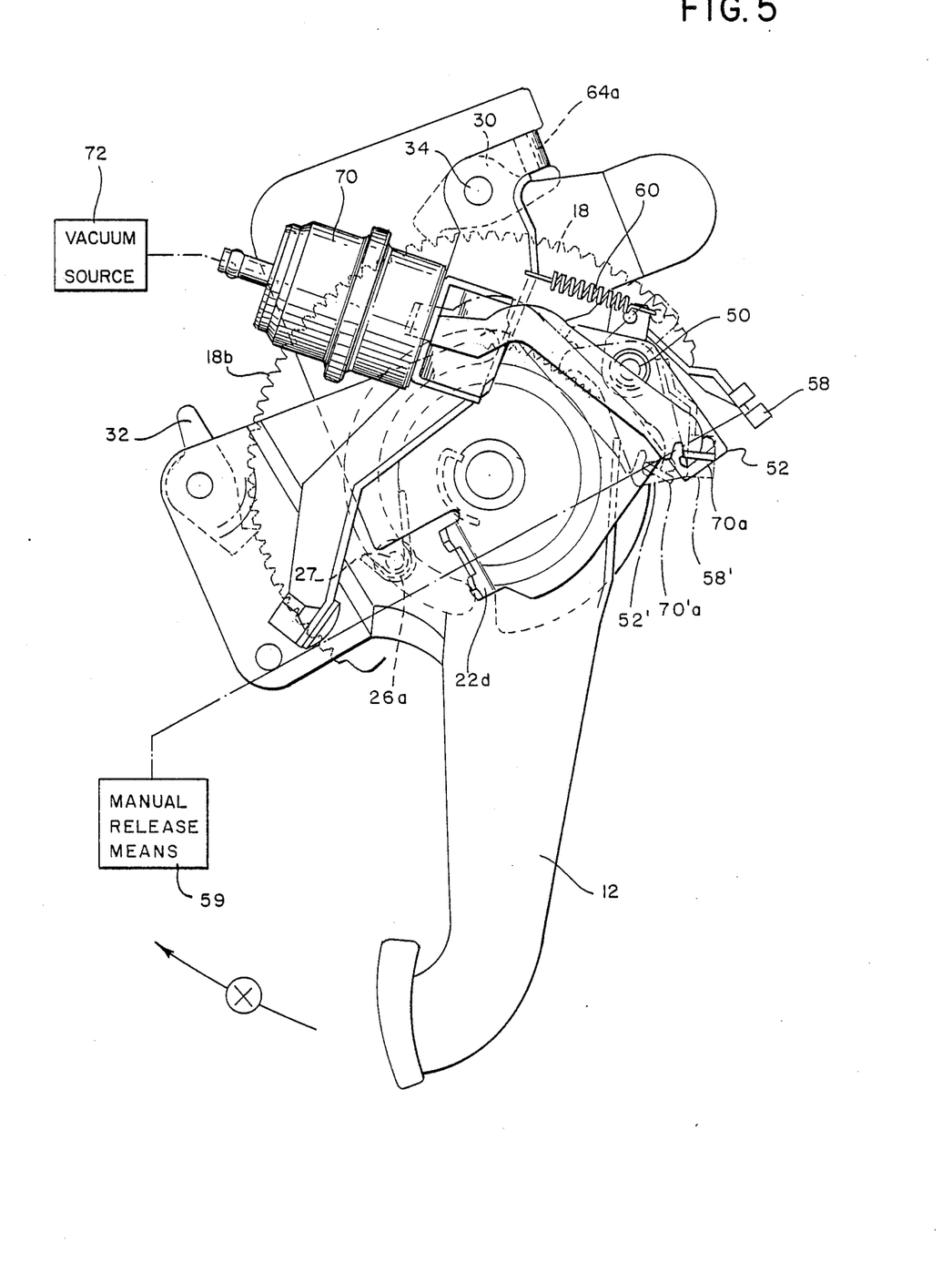

Referring now to the first phase of the release cycle shown in FIG. 5, after the control mechanism has been set, and upon actuation of the manual release lever 58 (either manually by the manual release control means 59, or automatically by the vacuum means 72 upon the starting of the vehicle), the manual release lever 58 pivots about its pivot shaft 50 to position 58' which in turn causes the pedal pawl 52 to rotate to a released position 52' shown in phantom, thereby disengaging the pedal teeth 12e to allow the pedal 12 to rotate in the clockwise direction of arrow "X", owing to the force created by the adjuster spring end 26a transmitted through the drive stud 27. If the control apparatus is optionally equipped with the vacuum canister, the vacuum canister arm 70a will cycle under vacuum to position 70a, thereby engaging slot 52b to release the pedal pawl 52, initiating the sequence discussed above.

Figure 6:
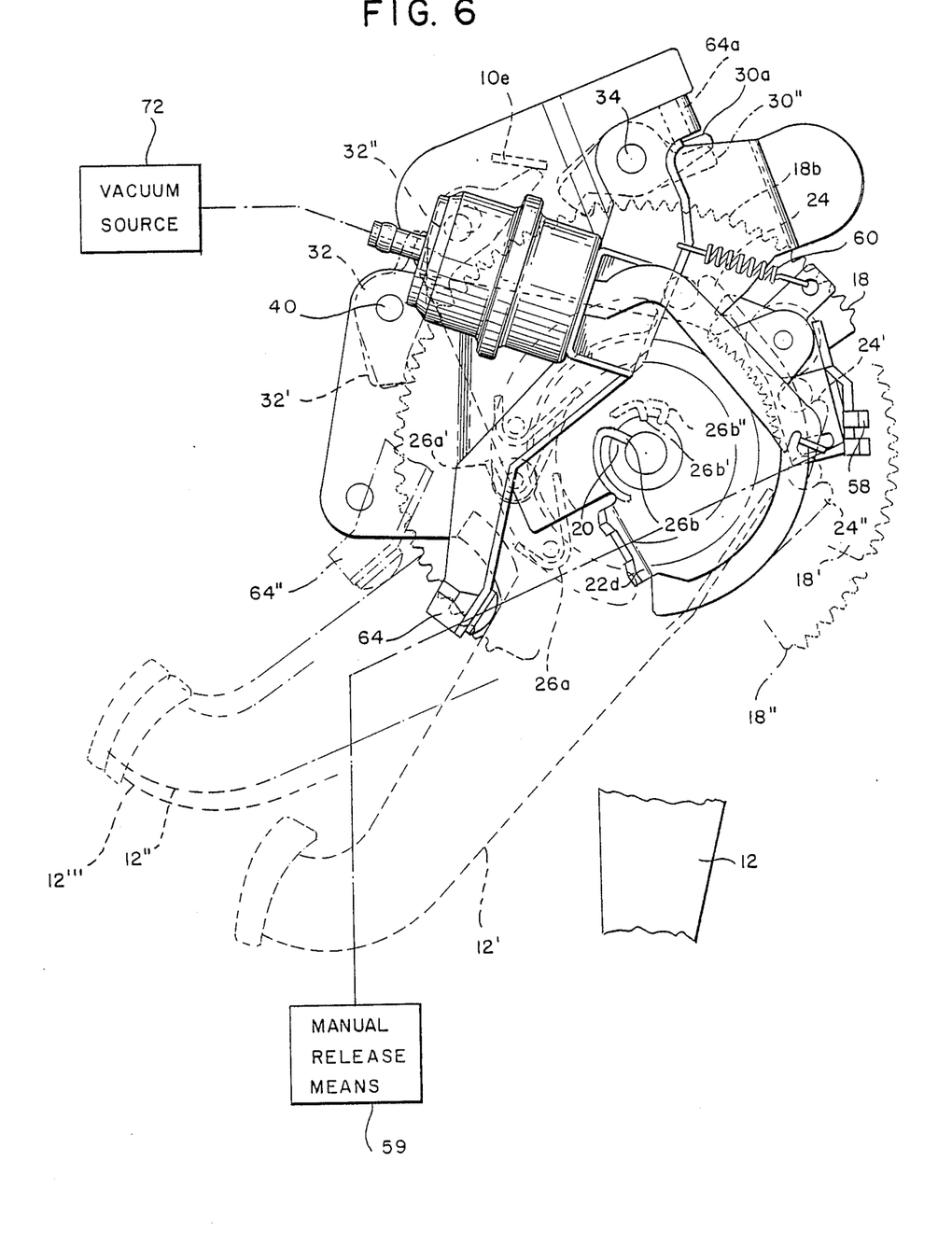

Referring now the final phase of the release cycle shown in reference to FIG. 6, as the adjuster spring leg 26a rotates with the pedal, the adjuster spring leg 26b remains fixed with the ratchet. Once the adjuster spring leg 26a reaches position 26a', it has driven the pedal 12 to position 12' at which time the pedal 12' starts to rotate the lock pawl release lever 64, and once the pedal 12 reaches position 12", it has rotated the lock pawl release lever to position 64" which in turn rotates the lock pawl 30 to a released position 30".

During the return of the pedal 12 toward intermediate position 12''', the drive pawl 32 freely moves in and out of the ratchet teeth 18b between the positions 32 and 32'. As the pedal rotates from position 12''' to position 12", the drive pawl at position 32" becomes disengaged as a result of contact with the mounting bracket fixed tab portion 10e, thereby allowing the ratchet 18 and cable track member 24 to pivot to the OFF positions 18' and 24', respectively, whereupon the adjuster spring leg 26b rewinds the adjuster spring 26 owing to its attachment through slot 20a in the pivot sleeve 20, and since the pivot sleeve 20 is fixed to the ratchet 18, a dampening effect is created upon the cable load release. Simultaneously, the adjuster spring leg 26b rewinds to the position 26b'.

There is no "hard stop" in the mechanism to react against the ratchet 18 and cable track member 24 resulting in no impact, shock or "slam off" upon cable load release. The mechanism also compensates for "over travel" resulting from the release cycle by simply allowing the ratchet 18 and cable track 24 to continue past the "at rest" positions 18" and 24", respectively, carrying the adjuster spring leg 26b to the position 26b". At a point when all return forces from the cable have been dissipated, the adjuster leg 26b will unwind the adjuster spring 26 until it reaches a point of equilibrium with respect to the cable tension (i.e. during displacement of spring end 26b from position 26" to position 26', the cable track member from position 24" to position 24', and the ratchet from position 18" to position 18').

Figure 7:
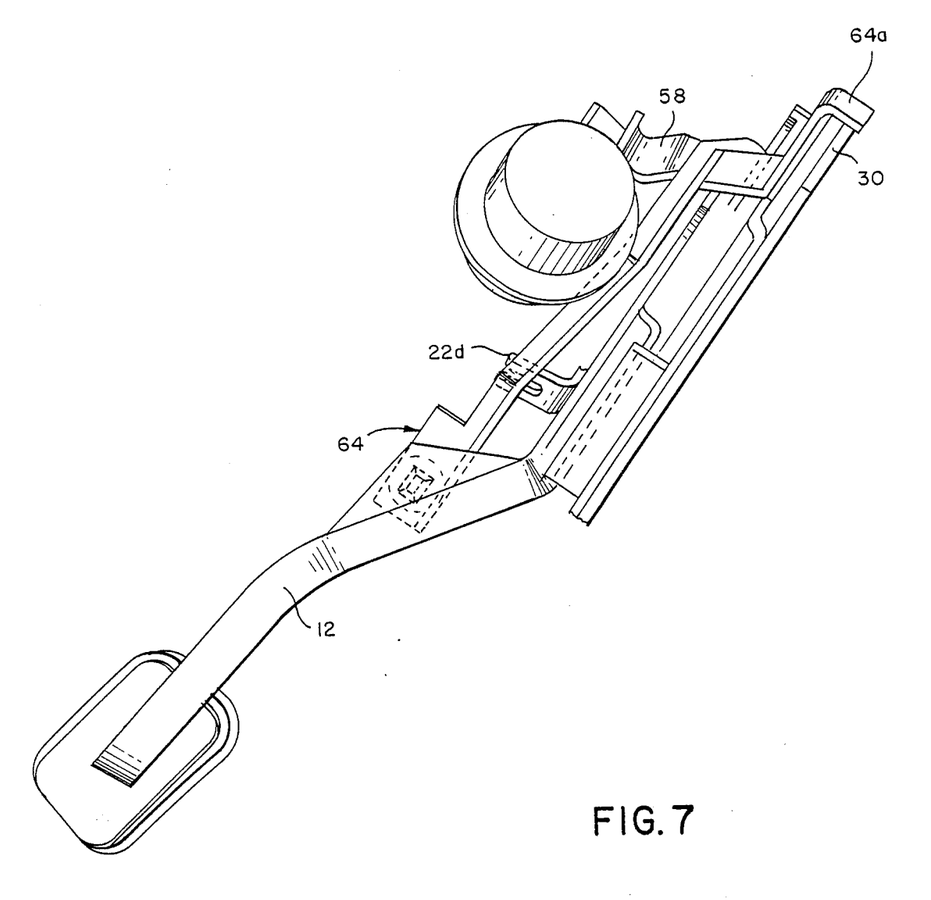
FIG. 7 is a detailed bottom plan view of the parking brake and lock pawl release lever arrangement.
Figure 8:
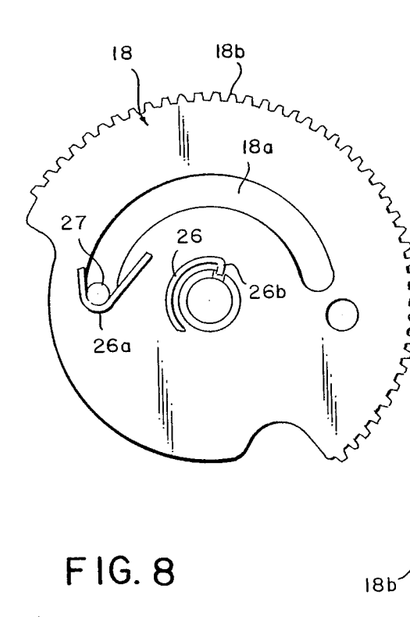
FIGS. 8 and 9 illustrate the operation of the tension adjuster.

Referring now to FIG. 7, as the pedal 12 is released (as discussed with regard to FIGS. 5 and 6), it contacts the lock pawl release lever 64 as shown. In FIG. 8, when in the shipped position, during assembly the ratchet 18 and track subassembly is fully rotated in the clockwise direction driving the adjuster spring leg 26a to wind the adjuster spring 26 while the drive stud 27 holds the adjuster spring leg 26a stationary, thereby winding the adjuster spring 26 to is maximum load position.

Figure 9:
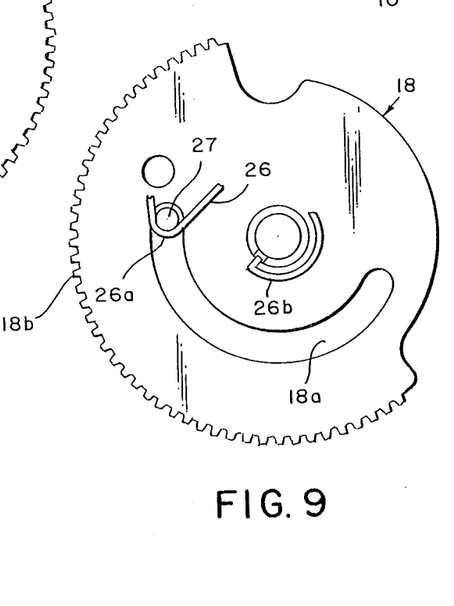

FIG. 9 shows the minimum torque position of the adjuster spring 26. If the cable were to break at any time, the drive stud 27 acts as a limit for the ratchet 18 and track sub-assembly 24, preventing it from fully unwinding and therefore simplifying service.

While in accordance with the provisions of the Patent Statutes, the preferred embodiments and modifications of the invention have been illustrated and described, it will be apparent to those skilled in the art that other modifications may be made in the apparatus described without deviating from the inventive concepts set forth above.

What is claimed is:

1. Apparatus for operating the inner member of a coaxial vehicle parking brake cable between brake-engaged and brake-released conditions, comprising:
   (a) mounting bracket means (8, 10) adapted for connection with the vehicle;
   (b) a foot-operated lever (12);
   (c) means including a main pivot shaft (14) pivotally connecting said lever for pivotal movement between brake-released and brake-engaged positions relative to said mounting bracket means;
   (d) cable tensioning means including:
      (1) a cable tension ratchet (18) including an integral sleeve portion (20) pivotally mounted concentrically on said main pivot shaft; and
      (2) a drive plate (16) mounted concentrically on said main pivot shaft on the opposite side of said cable tension ratchet from said lever, said drive plate being connected with said lever and said cable tension ratchet being adapted for connection with one end of said inner cable member, thereby to tension said inner cable member when said lever is in the brake-engaged position;
   (e) adjuster spring means biasing said cable ratchet in the cable tensioning direction relative to said lever, said spring means including a spiral spring (26) mounted concentrically on said ratchet integral sleeve portion, said cable tension ratchet containing an arcuate slot (18a) arranged concentrically about said pivot shaft, said spiral spring reacting at its inner end (26b) with a slot (20a) contained in said ratchet sleeve, the outer end of said spiral spring reacting with a drive stud (27) that extends through said arcuate slot for connection at opposite ends with said drive plate and with said lever, respectively;
   (f) means including a normally-engaged lock pawl (30) for releasably connecting said cable ratchet with said mounting bracket means;
   (g) means including a normally-engaged drive pawl (32) for releasably connecting said cable ratchet with said lever;

(h) means including a pedal ratchet (12e) and a normally-engaged pedal pawl (52) for connecting said lever with said mounting bracket means, each of said lock, drive and pedal pawls being operable in the ratcheting condition as said lever is pivoted in the brake-engaging direction;

(i) pedal pawl release means (58) operable to disengage said pedal pawl from said pedel ratchet;

(j) lock pawl release means (64) operable to disengage said lock pawl from said cable tensioning ratchet when said lever is pivoted toward the brake-released position; and (k) drive pawl release means (10e) operable to disengage said drive pawl from said cable tensioning ratchet when said lever is immediately adjacent its brake-released position, whereby said adjuster spring means is operable to pivot said cable ratchet relative to said housing and to said lever, thereby to tension the cable and to remove slack therefrom.

2. Apparatus as defined in claim 1, wherein said arcuate slot (18a) has such a length as to establish the limits of travel of said cable tension ratchet relative to said lever.

3. Apparatus as defined in claim 1, and further including a cover member (22) connected with said mounting bracket means to define a housing, said main pivot shaft being supported at opposite ends in openings (10b, 22a) contained in said mounting bracket means and in said cover member, respectively.

4. Apparatus as defined in claim 3, wherein said pedal pawl (52) is pivotally mounted on said cover member for pivotal movement about a pivot pin (50).

5. Apparatus as defined in claim 4, wherein said pedal pawl contains an oversized slot (52a) that receives the pedal pawl pivot pin and that permits slight displacement of said pedal pawl relative to the pedal pawl pivot pin along an axis concentric with said tension ratchet.

6. Apparatus as defined in claim 5, wherein said pedal pawl release means includes a release member (58) pivotally mounted on the pedal pawl pivot pin, and further including manually operable release means (59) for operating said release member to disengage said pedal pawl from said pedal ratchet means (12e).

7. Apparatus as defined in claim 6, and further including vacuum-responsive motor means (70) for operating said pedal pawl release member to disengage said pedal pawl from said pedal ratchet means.

8. Apparatus as defined in claim 7, wherein said vacuum-responsive motor means is mounted on said cover.

9. Apparatus as defined in claim 1, wherein said lock pawl is pivotally mounted on a lock pawl pin, and further wherein said lock pawl release means comprises a release lever (64) pivotally connected with said lock pawl pivot pin, said lock pawl release lever including a portion (64b) arranged for operation by said pedal as said pedal is pivoted toward the brake disengaged position.

10. Apparatus as defined in claim 1, wherein said drive pawl release means comprises a fixed tab portion (10e) on said mounting bracket means, said fixed tab portion being arranged for engagement by said drive pawl when said lever is adjacent its fully brake-released position.

* * * * *